UNITED STATES PATENT OFFICE.

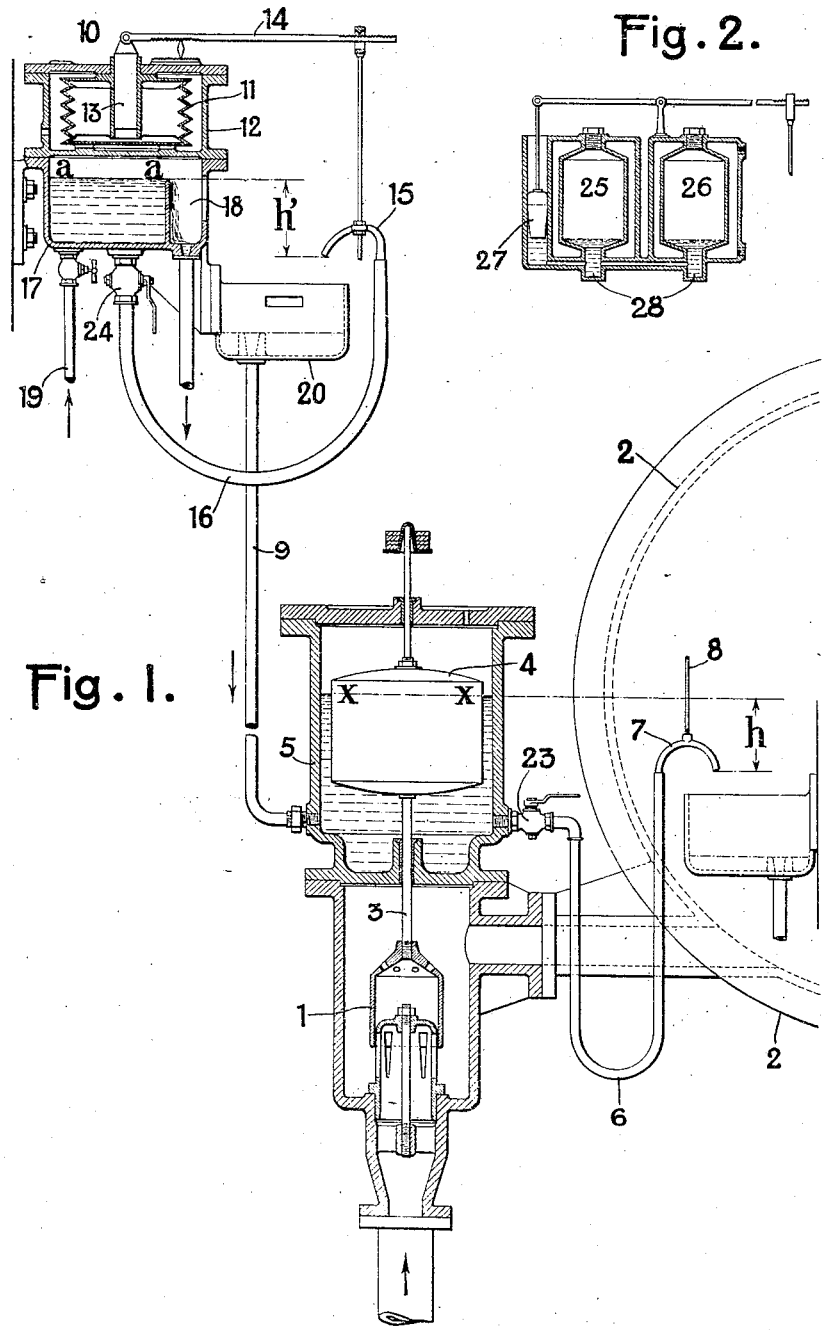

WILHELM ZÜBLIN, OF WINTERTHUR, SWITZERLAND.

HOT-WATER-HEATING INSTALLATION.

1,269,670.  Specification of Letters Patent.  Patented June 18, 1918.

Application filed July 23, 1917. Serial No. 182,304.

*To all whom it may concern:*

Be it known that I, WILHELM ZÜBLIN, a citizen of the Swiss Republic, and resident of Winterthur, Switzerland, engineer, have invented new and useful Improvements in Hot-Water-Heating Installations, of which the following is a full, clear, and exact specification.

It is known practice to use for the purpose of adjusting a valve or the like that controls a flow of water, a float, the position of which can be varied by varying the level of the liquid wherein it is floating.

This invention relates to apparatus of this kind for regulating the flow of water in hot water heating installations. According to the invention the change of the level of liquid in the float chamber for the purpose of moving the valve or the like as may be necessary to respond to several variable conditions, is brought about by automatic-adjusting devices connected with flexible pipes on which depends a flow of liquid through the float chamber, so that when the device raises or lowers the discharge end of the pipe the rate of flow of liquid to or from the float chamber is correspondingly varied. This mode of control works with minimum resistance and therefore lends itself to exact regulation, which is particularly advantageous when the heating installation utilizes the waste heat of a heat engine, such as a steam engine or turbine, because then the water flow to the heating device which utilizes the waste heat, such as a surface condenser, should be made to depend on the load on the engine, the external temperature and, in some cases, also on the temperature of the hot water circulating in the heating installation. The very small resistance offered by this new mode of control makes it very sensitive even to the smallest changes of temperature, for instance a single degree, whether it be external temperature or that of the circulating water, the flow of which is adjusted accordingly. The accompanying drawings illustrate the invention. Figure 1 is a vertical section of the whole apparatus in combination with a surface condenser serving as heating device; Fig. 2 shows by a vertical section a modification of a detail of this apparatus.

In the apparatus shown by Fig. 1, the valve 1 controls the entrance of water into a surface condenser 2 of a steam engine and is in the form of a hood sliding vertically on a slotted head to the supply pipe. Through its spindle 3 it is adjusted in position by the float 4 which rises and falls with the level $x$—$x$ of water in the chamber 5. For the purpose of varying this level $x$—$x$ the outflow from the chamber is connected with a hose-pipe 6 the discharge end 7 of which is raised or lowered through rod 8 by the governor of the engine.

When the flow of water into the chamber is exactly equal to the out-flow through the pipe 6 the level $x$—$x$ of the water remains constant. If the load on the engine increases the governor raises the discharge end 7 and the difference $h$ between the level of the outlet of this end and the level $x$—$x$ is diminished, whereupon the proportion of water leaving the chamber 5 is likewise diminished and if the supply of water to the chamber remains constant the level $x$—$x$ is raised until the flow of water into and out of the chamber has again become equal. The float 4 rises with the level $x$—$x$ and lifts the valve 1 so that the flow of water to the condenser 2 is increased as is necessary to utilize completely the waste heat of the steam engine operating under increased load.

On the contrary, the flow of water into the chamber 5 remaining constant, the level $x$—$x$ falls when there is a temporary diminution of the load on the engine.

The supply of water to the float chamber 5 through the pipe 9 is here shown as controlled by the temperature of the outside air through a regulator 10. This comprises an expansion vessel 11 in a box 12 to which the external air has access. The expansion vessel contains a suitable fluid and is closed by a piston 13 connected with a lever 14 from the other end of which is suspended the discharge end 15 of a hose-pipe 16.

When the external air becomes colder the piston 13 moves downward and the discharge end 15 is raised.

The pipe 16 is connected with the outlet of a feed tank 17 supplied through pipe 19 with water, the level $a$—$a$ of which is kept constant by the overflow 18. The water discharged from the end 15 flows into an intermediate vessel 20 from which it passes through the pipe 9 into the float chamber. The rate of flow of water from tank 17 through hose-pipe 16 depends on the level of the end 15, that is to say on the difference of level $h'$. A fall of the atmospheric temperature corresponds with a smaller difference $h'$, which means a diminished discharge from end 15, and as the vessel 20 is in direct connection with the float chamber 5, this diminished discharge means a fall of the level $x$—$x$ and of the float 4; consequently the flow of water to the surface condenser is lessened.

If the load on the engine happens to be constant this lessened flow of water means a higher temperature of water in the heating bodies, such as radiators, fed by the water from the condenser 2.

In combination with the regulator 10 there may be a second, similar heat regulator, the expansion vessel of which may be bathed, for instance, by the hot water issuing from the surface condenser and may control a second discharge hose-pipe through which water from the feed-tank 17 flows into the intermediate vessel 20 as already described, at a rate depending on the temperature of the condenser water; if this temperature increases there will be a greater difference $h'$ and more water will flow into the float chamber, raising float 4 and valve 1 to pass more water to condenser 2; a fall of the said temperature will produce the reverse effect.

By suitable adjustment, it may be by varying the translation of the levers, such as 14, or by opening or closing more or less the cocks 23, 24 of the hose-pipes 6, 16, the effects on the float may be so balanced or harmonized that the desired result in respect of the heating system is attained.

Fig. 2 shows a modification in which an expansion vessel for control by varying external temperature and one for control by the temperature of the circulating water, in the manner already described, are combined to operate on the same hose-pipe. The expansion or contraction of the fluid in the two vessels 25, 26 causes the rise or fall of a float 27 common to both. In this case it is well that the fluid in the vessels 25, 26 should be confined by mercury seals 28 which add to the effect in determining the level of the float 27.

A variation of the arrangement described consists in making the regulation of the temperature of the circulating water in accordance with external temperature, independent of the energy consumed by the engine. For instance, the discharge end 7 of the hose-pipe 6 may be controlled directly by the float 4.

What I claim is:

1. In a hot water heating installation, an apparatus for regulating the flow of circulating water, comprising a controlling valve for the flow of water, a movable float connected therewith, a float chamber containing the float and furnished with a liquid supply, flexible pipes, one being arranged to supply said float chamber, the other serving for the outflow of liquid therefrom, so as to determine a regulable flow of liquid through the same and automatic adjusting devices connected with said flexible pipes and arranged to raise or lower them in dependence of variable magnitudes in order to correctly harmonize the liquid flow through said float chamber according to variations of said magnitudes, substantially as and for the purpose described.

2. In a hot water heating installation, the combination of a heat engine and a waste heat recovering device for heating the circulating water, with an apparatus for regulating the flow of circulating water, comprising a controlling valve for the flow of water, a movable float connected therewith, a float chamber containing the float and furnished with a liquid supply, a liquid supplying vessel having means to maintain the liquid therein at a certain level, a flexible pipe connected to said liquid supplying vessel and arranged so as to determine a supply flow of liquid to the said float chamber, an automatic adjusting device arranged to operate on temperature variations and connected with said flexible pipe to raise or lower it according to temperature variations in view of regulating the liquid supply flow to the float chamber, a second flexible pipe connected to the latter for discharging liquid therefrom and coupled with the governor of the heat engine to be raised or lowered by the same in dependence of the engine load, substantially as and for the purpose described.

3. In a hot water heating installation, the combination of a heat engine and a waste heat recovering device for heating the circulating water, with an apparatus for regulating the flow of circulating water, comprising a controlling valve for the flow of water, a movable float connected therewith, a float chamber containing the float and furnished with a liquid supply, a liquid supplying vessel with constant liquid supply, a flexible pipe connected to the said liquid supplying vessel, an intermediate vessel connected to the float chamber and arranged to be supplied from said flexible pipe, an automatic adjusting device arranged to operate on temperature variations and connected with said flexible pipe to raise or lower it according to temperature variations in view of regulating the liquid supply flow to the float chamber, a second flexible pipe connected to the latter for discharging liquid therefrom and coupled with the governor of the heat engine to be raised or lowered by the same in dependence of the engine load, substantially as and for the purpose described.

In witness whereof I have hereunto signed my name this 29th day of June, 1917, in the presence of two subscribing witnesses.

WILHELM ZÜBLIN.

Witnesses:
AMAND RITTER,
AMAND BRAUN.

Copies of this patent may be obtained for five cents each, by addressing the "Commissioner of Patents, Washington, D. C."